(12) United States Patent
Diener et al.

(10) Patent No.: US 10,357,725 B2
(45) Date of Patent: Jul. 23, 2019

(54) METHOD FOR PRODUCING MOULDED ARTICLES

(71) Applicant: LIST HOLDING AG, Arisdorf (CH)

(72) Inventors: Andreas Diener, Miltitz (DE); Andreas Grundei, Rickenbach (DE); Oliver Tretzack, Hasel (DE)

(73) Assignee: List Holding AG, Arisdorf (CH)

( * ) Notice: Subject to any disclaimer, the term of this patent is extended or adjusted under 35 U.S.C. 154(b) by 557 days.

(21) Appl. No.: 14/395,334

(22) PCT Filed: Apr. 16, 2013

(86) PCT No.: PCT/EP2013/057931
§ 371 (c)(1),
(2) Date: Oct. 17, 2014

(87) PCT Pub. No.: WO2013/156489
PCT Pub. Date: Oct. 24, 2013

(65) Prior Publication Data
US 2015/0114256 A1    Apr. 30, 2015

(30) Foreign Application Priority Data

Apr. 17, 2012    (DE) .................. 10 2012 103 296

(51) Int. Cl.
| | | |
|---|---|---|
| *B01D 1/06* | (2006.01) | |
| *B01D 1/04* | (2006.01) | |
| *B01D 1/22* | (2006.01) | |
| *D01D 1/02* | (2006.01) | |
| *C08K 5/32* | (2006.01) | |
| *D01F 2/00* | (2006.01) | |

(52) U.S. Cl.
CPC .............. *B01D 1/065* (2013.01); *B01D 1/04* (2013.01); *B01D 1/22* (2013.01); *C08K 5/32* (2013.01); *D01D 1/02* (2013.01); *D01F 2/00* (2013.01)

(58) Field of Classification Search
CPC ............. B01D 1/065; B01D 1/04; B01D 1/22
See application file for complete search history.

(56) References Cited

U.S. PATENT DOCUMENTS

| | | |
|---|---|---|
| 3,447,939 A | 6/1969 | Johnson |
| 4,142,913 A | 3/1979 | McCorsley, III et al. |
| 4,581,072 A | 4/1986 | Laity |

(Continued)

FOREIGN PATENT DOCUMENTS

| | | |
|---|---|---|
| CN | 1042165 A | 5/1990 |
| CN | 101952322 A | 1/2011 |

(Continued)

OTHER PUBLICATIONS

Chinese Office Action for 201380020696.8, dated Dec. 11, 2015.
(Continued)

*Primary Examiner* — Renee Robinson
(74) *Attorney, Agent, or Firm* — Bachman & LaPointe, PC

(57) ABSTRACT

A method for producing molded articles from a base substance which is mixed with a solvent to produce a molding solution, and subsequently this solvent is at least partially removed from the molding solution and the molding solution is supplied to a device (8) for molding, the molding solution is supplied to a vertical cylindrical thin-film evaporator (2) and a horizontal cylindrical thick-film dissolver (4).

16 Claims, 1 Drawing Sheet

(56) References Cited

U.S. PATENT DOCUMENTS

| | | |
|---|---|---|
| 5,407,266 A | 4/1995 | Dötsch et al. |
| 5,534,113 A | 7/1996 | Quigley et al. |
| 5,888,288 A | 3/1999 | Quigley et al. |
| 5,948,905 A | 9/1999 | Connor et al. |
| 6,120,612 A * | 9/2000 | Mitsuhashi ............ B01J 19/18 127/16 |
| 6,610,134 B1 | 8/2003 | Kind et al. |
| 6,875,756 B1 | 4/2005 | Michels et al. |
| 9,206,528 B2 | 12/2015 | Diener et al. |
| 2011/0024931 A1 | 2/2011 | Diener et al. |
| 2011/0034646 A1 * | 2/2011 | Fuji ...................... C08G 64/30 526/65 |

FOREIGN PATENT DOCUMENTS

| | | |
|---|---|---|
| DE | 1713486 U | 12/1955 |
| DE | 4118884 A1 | 12/1992 |
| DE | 19837210 C1 | 11/1999 |
| DE | 19940521 A1 | 4/2001 |
| EP | 0111518 B1 | 10/1986 |
| EP | 0356419 A2 | 2/1990 |
| JP | 10512009 A | 11/1998 |
| JP | 2011512460 A | 4/2011 |
| WO | 94/06530 A1 | 3/1994 |
| WO | 9711973 A1 | 4/1997 |
| WO | 02/20885 A1 | 3/2002 |
| WO | 2009/098073 A1 | 8/2009 |

OTHER PUBLICATIONS

Chinese office action for Apln. No. 201380020696.8 dated Jan. 4, 2017.

Japanese examination report for application No. 2015-506216 dated Jan. 16, 2017.

* cited by examiner

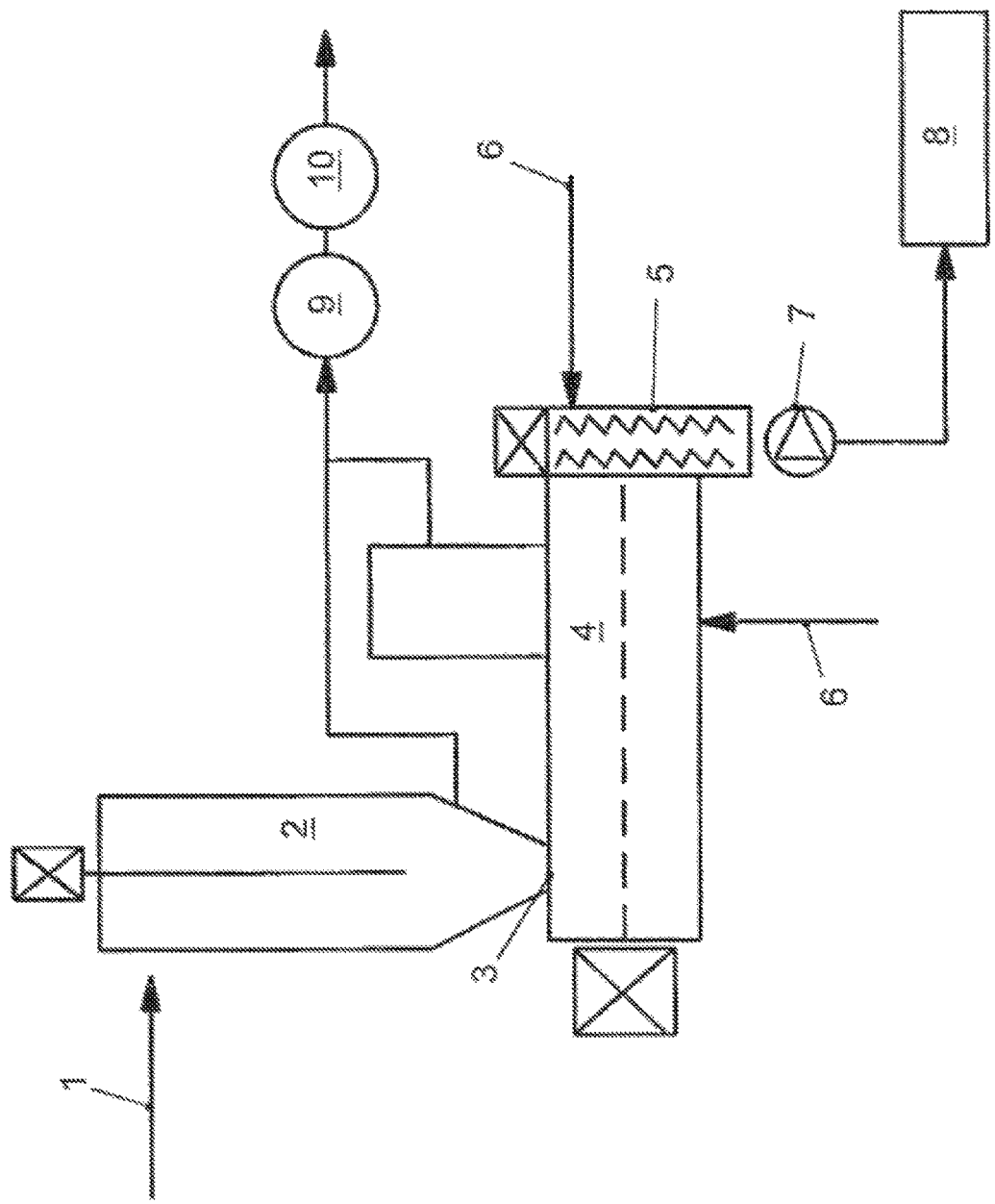

METHOD FOR PRODUCING MOULDED ARTICLES

The present invention relates to a method for producing molded articles from a base substance.

In the present case, the term "molded articles" subsumes all possible articles obtainable from a natural or artificial base substance. This is generally accomplished with the aid of a molding tool whereby the base substance is brought into a mold for the molded articles. An example which may be mentioned, purely illustratively and by no means exhaustively, is viscose fiber. Viscose fibers are fibers consisting of cellulose as base material and industrially produced via the viscose process. The chemical nature of viscose fibers resembles that of cotton fibers.

Modal fibers are a similar product to viscose fibers. They likewise consist 100% of cellulose and, just like viscose fibers, are produced from natural pulp. However, a somewhat different process results in higher fiber strength and improved fiber properties being achieved.

The class of cellulosic fibers further includes the fibers known as lyocell fibers. In the production of lyocell fibers, the nontoxic solvent NMMO (N-methylmorpholine N-oxide) is used to dissolve the pulp directly and in unchanged form, without prior reaction with caustic soda and derivatization to the xanthate. Lyocell fibers are spun in a dilute aqueous NMMO bath by going below the solubility limit of the cellulose and thereby forming a thread. For this purpose, the corresponding spinning solution is pressed through spinneret dies. This lyocell process is described for example in DE 1 713 486, U.S. Pat. No. 3,447,939 or EP 0 111 518. The suitable spinning solution is produced for example in a vertically disposed cylindrical thin-film dissolver (a filmtruder), as described for example in U.S. Pat. No. 5,888,288, A, or in a horizontal thick-layer dissolver (a kneading reactor) as described in DE 198 37 210 or WO 02/20885 A1.

Specific reference is made to U.S. Pat. No. 5,948,905 A where a thin-film evaporator is shown with an assigned vacuum pump in the last stage of a multistage flash evaporation process. The product passes from the thin-film evaporator directly into an extruder and is discharged into a filtration means.

WO 94/06530 discloses a method of the type in question wherein a cellulose slurry is introduced into a thin-film evaporator. In this thin-film evaporator, evaporation of water and dissolution of the cellulose in N-oxide takes place, so a molding solution becomes highly concentrated. This molding solution is then discharged through a discharge means.

In these devices and known methods, the spinning solution is produced in the further processable viscosity needed for the spinning process and the cellulose concentration associated therewith.

Neither device for forming the spinning solution for the production of lyocell fibers is ideal for the entire process of dissolving the base material pulp in the solvent NMMO. A vertical thin-film dissolver has a good heat-transfer performance, but a short residence time, thereby failing to ensure the requisite swelling of the natural fibers and the requisite homogenization for a perfect spinning solution. A horizontal thick-layer dissolver does provide a longer residence time, which leads to good penetration of the solvent into the fiber and hence to good homogenization for a very good spinning solution.

Nonetheless, however, both devices are currently being used in the industry to form the spinning solution for lyocell fibers. Owing to the suboptimal conditions described above, the dissolvers for both processes are becoming larger and larger and are limited by their maximum size of construction. Comparatively large line capacities of more than 50 metric tons of fibers a day are impossible to realize with these devices being operated in this way. Capacities of 100 metric tons of fibers per day per production line are needed to make this technology more efficient, and hence competitive to viscose or modal, in the long term.

The problem addressed by the present invention is that of optimizing the abovementioned method such that larger capacities of, for example, more than 100 metric tons of fibers per day per production line may be achieved.

SUMMARY OF THE INVENTION

The problem is solved by the features of the present invention wherein the dissolution process of the pulp base material in NMMO is analyzed in process-engineering terms on the basis of the two known devices.

It was determined that the dissolution process can in principle be subdivided into three sections that require very different processing conditions. The first section is where the water evaporates from a pulp-solvent suspension (also called slurry) up to the point where the pulp starts to dissolve, which corresponds to the reaching of the dissolution window and hence approximately to the 2.5 hydrate of the NMMO. This section requires a lot of thermal energy to evaporate the water, but does not need any additional residence time, since the pulp does not as yet dissolve, and the viscosity of the suspension is low.

After reaching the dissolution window, the second section is where the main dissolution with a pronounced increase in viscosity and the lower rate of water evaporation needed for this, down to the approximately 1.5 hydrate of NMMO, take place.

The third section is governed by the homogenization of the spinning solution and a likewise lower rate of water evaporation down to the approximately 0.8 to 1.0 hydrate depending on pulp concentration.

The process-engineering analysis, then, shows in connection with the devices used for the dissolving stage that a thin-layer evaporator is by virtue of its good heat-transfer performance very highly suitable for a high rate of water evaporation at low viscosity and short residence time in the first section and that a thick-layer dissolver is by virtue of its very good homogenization performance, the longer residence times and also the processing of higher viscosities and the lower rate of water evaporation very highly suitable for the second and third sections.

Continuous tests using a multi-stage pilot plant have shown that this subdivision into sections results in a balanced equilibrium, so artful subdivision and optimum linking of the two device variants made it possible to solve the present problem by the direct combination of the thin-film evaporator with the thick-layer dissolver.

The two devices are linked such that the product spaces are in direct communication, as a result of which the transfer point, being a complicated interface, is located on the inside and hence the transfer of partly changing product consistencies is eliminated. Variations due to a low hold-up on the part of the thin-film dissolver are easily rectifiable by the thick-layer dissolver.

To further enhance the capacity of the process, the concentrated solution already explained in WO 2009/098073 was included for consideration. This makes it possible to combine the two-stage process of producing the spinning solution with the concentrated solution of the cellulose with subsequent back-dilution and thereby achieve a still further increase in efficiency.

As already in the case of WO 2009/098073, the concentration of the molding solution and/or of the thinner shall be policed via the optical index (refractive index). This is accomplished in the case of the thinner before incorporation into the molding solution and/or in the case of the molding solution after dilution. What is desired is an optical index for the thinner and/or the molding solution that is in the range from 1.45 to 1.52.

The solvent and/or diluent used is preferably an aqueous tertiary amine oxide. However, the invention shall not be restricted thereto. Nor is the invention restricted to pulp, but also comprehends substances such as proteins, polylactides or starch or a mixture thereof.

Which molded article is produced is of minor importance with the present method. Preference is given to producing filaments, fibrous nonwoven webs and/or filament yarn. However, it is also possible to produce film, hollow fibers, membranes or the like. The molding of the solution into a desired cellulosic molded article may be effected using known spinneret dies for producing fibers, slot dies or hollow-fiber spinneret dies. After molding, i.e., prior to being introduced into the coagulation bath, the molded solution may also be stretched.

BRIEF DESCRIPTION OF THE DRAWINGS

Further advantages, features and details of the present invention will become apparent from the ensuing description of preferred exemplary embodiments and also from the drawing:

The FIGURE shows a schematic block diagram of a method for producing molded articles from a base substance from renewable raw materials in accordance with the present invention.

DETAILED DESCRIPTION

The cellulose needed for this or, to be more precise, the premixed cellulose slurry is fed via supply line 1 to a thin-film evaporator 2. These kinds of vertical cylindrical apparatus are known from U.S. Pat. No. 5,888,288 for example.

The thin-film evaporator concentrates the suspension. From the thin-film evaporator the concentrated suspension transfers directly into a thick-layer dissolver, preferably a horizontal kneading reactor 4. These kneading reactors are known from DE 199 40 521 A1 or DE 41 18 884 for example. However, the invention is not restricted to these thin-film evaporators and these kneading reactors. The invention encompasses all treating means in which renewable raw materials can be subjected to a treatment for later shaping.

In the present exemplary embodiment, the renewable raw material is treated by means of a solvent, preferably an aqueous tertiary amine oxide, already mixed previously as a cellulose slurry and accordingly fed in supply line 1 to the thin-film evaporator.

In the thin-film evaporator 2, heat is added to effect water evaporation from the suspension to a degree which falls short of leading to the dissolution of the pulp.

In the kneading reactor 4, heat is added to effect intensive commixing of the raw material with the solvent, some partial evaporation of the water from the solvent and hence the dissolution of the pulp to obtain a relatively high-viscosity spinning solution. This spinning solution is then fed via a discharge means 5 to the spinning rig 8.

Before finally being processed into lyocell fibers, the relatively high-viscosity spinning solution is diluted to form a spinnable solution of pulp. This is accomplished in the discharge means 5 via a supply line 6 or even upstream of the discharge means 5 in the kneading reactor 4 at any point and/or with splitting. Combining the two sites of addition is also conceivable.

A pump 7 is positioned downstream of the discharge means 5 and upstream of the spinning rig 8 to back up the molding solution after discharge. The method of the present invention is carried out as follows:

Supply line 1 sends the suspension, consisting of the base substance, in particular the renewable raw material, and the solvent, into the thin-film evaporator 2. Heat is added from the outside via a heating jacket to effect intensive evaporation of water from the suspension up to the dissolution window without starting the dissolution of the base substance.

The concentrated suspension leaves the thin-film evaporator 2 through a direct transition 3 to pass directly into the thick-layer dissolver 4. In the thick-layer dissolver 4, a kneading reactor, intensive commixing takes place, while the heat which is added may be added from the outside by means of a heating jacket, through heated kneading shafts and/or through heated kneading elements (disk elements) 25. There is a further mechanical input of heat in the course of the commixing itself, through the shearing energy of commixing.

As some of the solvent evaporates, the suspension transforms into a molding solution (spinning solution) and becomes further concentrated, such that it comprises approximately a base substance fraction of from 14 to 28% at the downstream end of the kneading reactor 4 just upstream of the discharge means 5. This molding solution is too viscous for later spinning. It is then thinned with a thinner which is supplied via supply line 6. In the process, the concentration of the molding solution before and/or after addition of the thinner is policed via the optical index. This optical index is also called the refractive index. It characterizes the refraction (change of direction) and the reflection characteristics (partial reflection and total reflection) of electromagnetic waves on encountering a boundary layer between two media.

It is further conceivable for an additive to be additionally provided to the mixture/molding solution upstream of the discharge or into the discharge, optionally also via supply line 6. An additive or additive mix may also be provided together with the thinner.

Vapors produced in the thin-film evaporator 2 and/or the kneading reactor 4 are fed via a gas space connector 9 to a condenser 10.

The invention claimed is:

1. A method for preparing a spinning solution for producing lyocell fibers, comprising the steps of:
    providing a base substance of cellulose;
    mixing the base substance with a solvent to produce a solution;
    subsequently removing at least a portion of the solvent from the solution to produce a spinning solution by feeding the solution to a vertical cylindrical thin-film evaporator (2) wherein evaporation takes place and thereafter a horizontal cylindrical thick-layer dissolver (4) wherein further evaporation takes place.

2. The method as claimed in claim 1, wherein the solvent is an aqueous tertiary amine oxide.

3. The method as claimed in claim 2, including concentrating the spinning solution in the thin-film evaporator (2) by water evaporation to a pre-dissolution state corresponding to an approximately 2.5 hydrate of a tertiary amine oxide.

4. The method as claimed in claim 3, wherein the spinning solution of the thin-film evaporator (2) is concentrated to about 0.8 to 1.0 hydrate, dissolved and homogenized into a final spinning solution in the thick-layer dissolver (4) by water evaporation.

5. The method as claimed in claim 1, wherein at least one of the thin-film evaporator (2) and the thick-layer dissolver (4) is operated at 80° to 180° C.

6. The method as claimed in claim 1, wherein at least one of the thin-film evaporator (2) and the thick-layer dissolver (4) is operated at 100° to 150° C.

7. The method as claimed in claim 5, wherein at least one of the thin-film evaporator (2) and the thick-layer dissolver (4) is operated under a vacuum of 20 to 200 mbar absolute.

8. The method as claimed in claim 5, wherein at least one of the thin-film evaporator (2) and the thick-layer dissolver (4) is operated under a vacuum of 30 to 100 mbar absolute.

9. The method as claimed in claim 6, including permanently monitoring the temperatures along the axes of at least one of the thin-film evaporator (2) and of the thick-layer dissolver (4).

10. The method as claimed in claim 9, wherein the monitoring is carried out using an optical index, which is between 1.47 and 1.52.

11. The method as claimed in claim 9, wherein the monitoring is carried out using an optical index, which is between 1.48 and 1.50.

12. The method as claimed in claim 2, wherein the spinning solution is back-diluted with a thinner to the viscosity required for spinning.

13. The method as claimed in claim 12, wherein the thinner is an aqueous tertiary amine oxide.

14. The method of claim 1, wherein the step of feeding the solution thereafter to the horizontal cylindrical thick-layer dissolver (4) results in dissolving, homogenization and concentration of the solution from the thin-film evaporator (2) in the thick-layer dissolver (4).

15. A device for carrying out the method as claimed in claim 1, wherein the thin-film evaporator (2) and the thick-layer dissolver (4) are in direct communication with each other and, through evaporation lines from each of the thin-film evaporator (2) and the thick-layer dissolver (4), are in communication with a gas space connector (9).

16. The device as claimed in claim 15, further comprising a condenser (10) in communication with the gas space connector (9).

* * * * *